Figure 1:
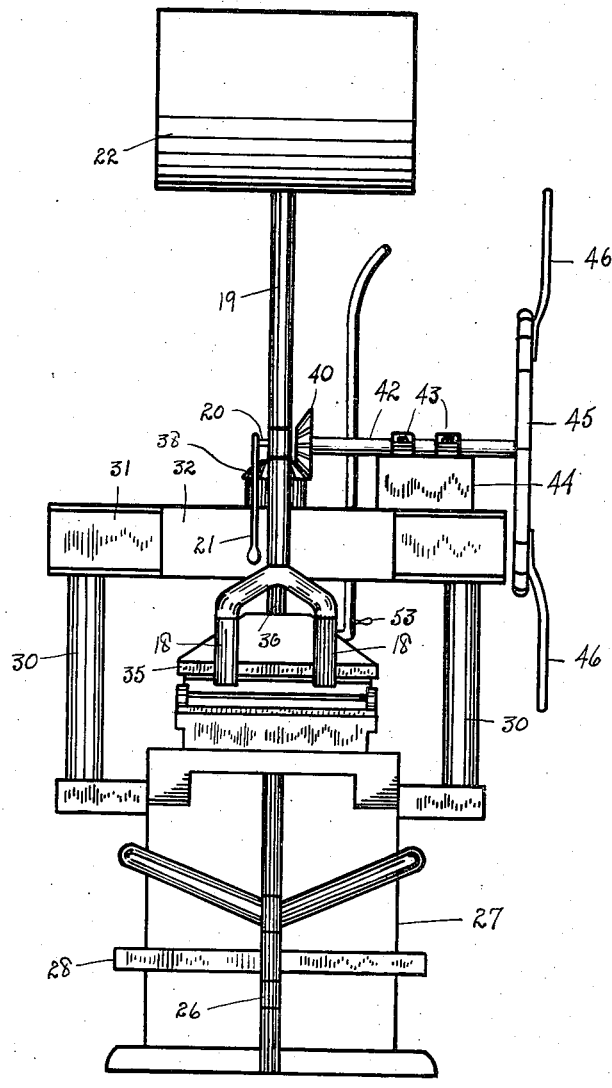

R. W. JAGENBURG.
MACHINE FOR MAKING SHINGLES.
APPLICATION FILED JULY 17, 1920.

1,415,649.

Patented May 9, 1922.
2 SHEETS—SHEET 1.

INVENTOR.
Robert W. Jagenburg
BY
Thomas L. Wilder
ATTORNEY.

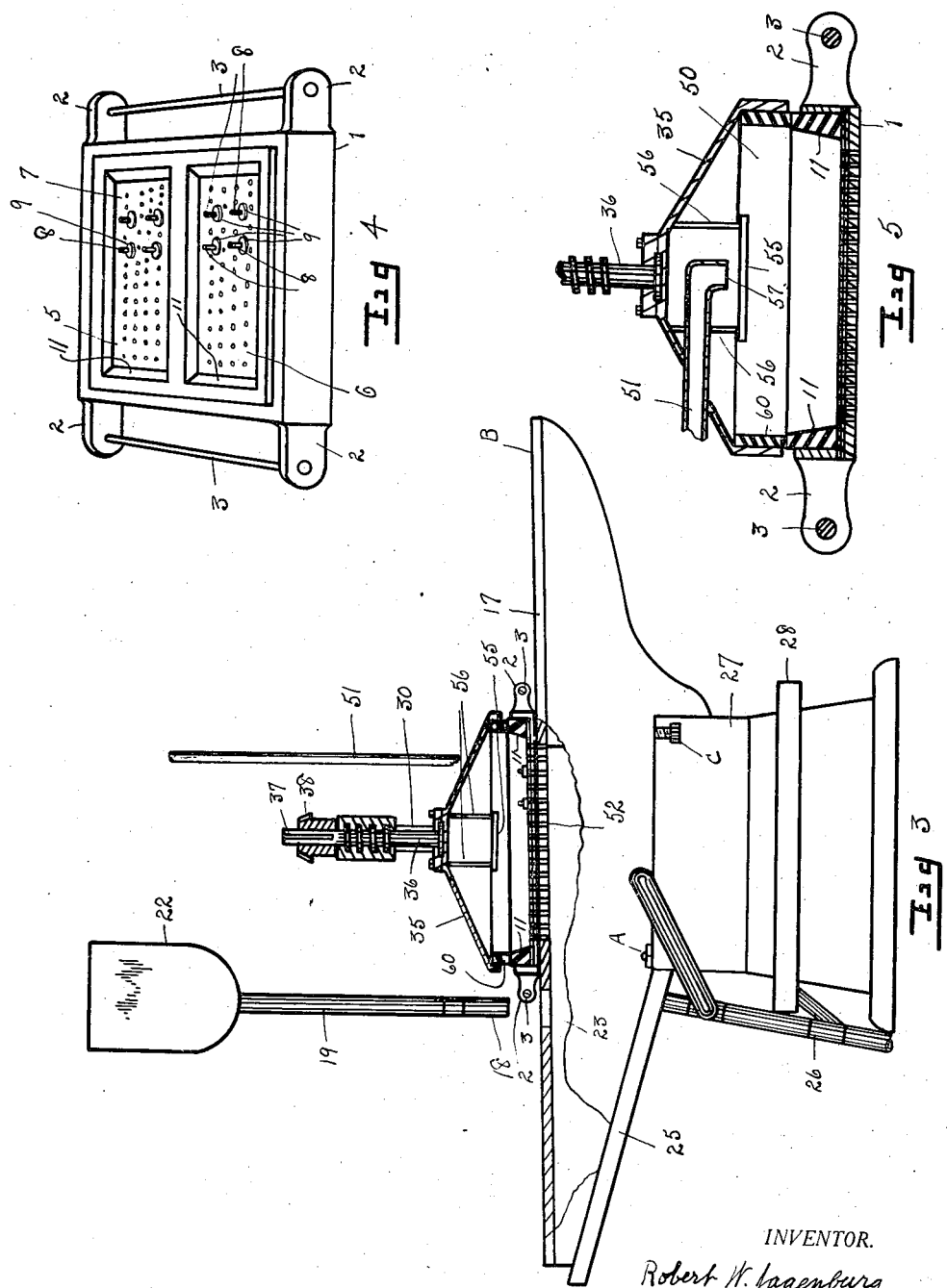

UNITED STATES PATENT OFFICE.

ROBERT W. JAGENBURG, OF UTICA, NEW YORK, ASSIGNOR TO M. WILLIAM BRAY, OF UTICA. NEW YORK.

MACHINE FOR MAKING SHINGLES.

1,415,649. Specification of Letters Patent. Patented May 9, 1922.

Application filed July 17, 1920. Serial No. 397,043.

*To all whom it may concern:*

Be it known that I, ROBERT W. JAGENBURG, a citizen of the late German Empire, and having declared his intentions of becoming a U. S. citizen, residing at Utica, in the county of Oneida and State of New York, have invented certain new and useful Improvement in Machines for Making Shingles, of which the following is a specification, reference being had therein to the accompanying drawing.

My invention relates to a machine for making shingles, and I declare the following to be a full, clear, concise and exact description thereof sufficient to enable anyone skilled in the art to which it appertains to make and use the same, reference being had to the accompanying drawings in which like reference characters refer to like parts throughout the specification.

The object of the invention is to provide a machine for making shingles, slabs, brick and kindred products from hydraulic or Portland cement and a fibrous material such as asbestos. The machine is equipped with an air compression device and with a mould that embodies a rectangular shaped frame having two or more compartments or sections, whereby two or more shingles or other product can be made simultaneously. Each section has its sides covered with rubber or other suitable composition to which the cement and asbestos mixture will not adhere. Moreover, the inner sides of the rubber are beveled in order to form shingles or like product with beveled edges that are not only easily removed from the mould but produce a shadow line effect. The beveled edges, furthermore, act as a frost protector by allowing for the expansion and contraction thereof when applied to a roof or other surface which they ultimately cover.

The mould is covered on the bottom thereof with a perforated steel plate over which is placed one or more laminate layers of finely perforated brass, copper or other suitable material, which affords much resistance to the applied compressed air, thereby effecting a greater economy of said air than the cotton or other fabric partition heretofore employed.

Moreover, the mould is equipped with pins disposed in upstanding position from the bottom of said mould and surrounded with washers, whereby to form apertures through said shingles and countersunk recesses adjacent said apertures for the projection and flush fitting of nails used to secure the shingles to a roof or other place to be covered.

Figure 2:
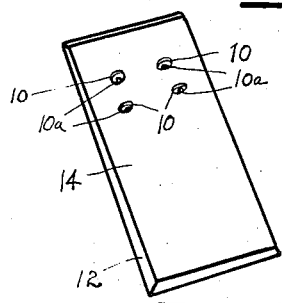

The object will appear by referring to the drawings, in which:

Fig. 1 is a front elevation of the machine;
Fig. 2 is a perspective view of a shingle formed by said machine;
Fig. 3 is a side elevation of the machine, showing the mould and certain other parts in section;
Fig. 4 is an enlarged perspective view of the mould used;
Fig. 5 is an enlarged view showing a central vertical section of the mould and certain immediate parts of the machine that cooperate with said mould.

Referring more particularly to the drawings, the machine embodies a mould —1— having a frame of rectangular shape and made of aluminum or other suitable metal. The ends 2—2 are formed on opposite sides thereof, whereby to carry rods 3—3 that are used in moving the frame —1— into and out of the machine. Within the frame —1— is formed two separate sections or compartments 5 and 6. The bottom of the mould —1— is made of a perforated steel plate over which is laid one or more laminate layers of finely perforated brass, copper or other material in mesh.

Four pins 8 are secured in upright position to the bottom or base 7 of each section. Surrounding said pins 8 are washers 9 which lay adjacent the bottom 7. The pins 8 are intended to form apertures in the shingles for the projection of nails therethrough, whereby to fasten said shingles to the roofs of houses or other desirable places. The counter sunk recess 10 adjacent said holes 10ª are intended for housing the heads of said nails, whereby said heads will fit flush with the surface of the shingle when it is secured in position on a roof. Pins 8 are arranged in parallel rows in each compartment.

The sides 11 of the compartments 5 and 6 are covered with a rubber or other suitable composition of any desirable thickness, which rubber is cemented, vulcanized or in any other way fastened to the frame —1—. Rubber is used for the reason that the cement and asbestos mixture will not adhere to the same. It, thereby, aids in releasing the pressed shingles from the moulds.

The inner surface of the rubber forms beveled sides to the mould, whereby to make shingles with similarly beveled edges 12, which are adapted to produce a shadow line effect as well as to afford protection against frost by allowing for the expansion and contraction of the shingles after being secured in place upon a roof or other surface. Moreover, the beveled sides of the mould will aid in removing the pressed shingles therefrom.

Inasmuch, as the bottom 7 is made with a perforated steel plate covered with laminate layers of finely perforated brass or copper, as above stated, it will have the advantage of wear and give a smoother and more even surface to the shingles than heretofore found possible with the fabric diaphragm. Moreever, the metal economizes in compressed air for the reason that the same affords more resistance to the applied compressed air than cotton or other fabric diaphragm heretofore employed. Furthermore, the mixture settles in the pores of the fabric, after very short usage thereof, and, thereby interferes with the perfect and uniform process of pressing and water elimination.

The mould —1— is placed upon the table 17 which is hinged to the standard 27 at A—A, whereby the end B of said table 17 can be elevated to any desired angle in order to effect an incline of the mould —1—, whereby to make the shingles 14 thicker at one end than at the other. The angle of incline is controlled by a set screw C screw mounted to the standard 27.

The mould —1— is disposed directly beneath the conduit outlet pipes 18—18 that branch off from pipe 19. When the mould —1— is so placed, the pipes 18—18 will be located above the centers of the compartments 5 and 6. Pipes 18 are made of some flexible material such as rubber or fabric, whereby they can be moved easily to any desired location by the hand of the operator. Pipe 19 has a valve 20 controlled by a hand lever 21, which governs the admission of cement asbestos mixture through pipes 18—18 to the compartments 5 and 6. Moreover, pipe 19 is connected with the supply tank 22 fastened overhead.

Recesses 23—23 are made in the top of the table 17 directly below the location of the ends of the conduit pipes 18 in order to carry off any of the cement asbestos mixture that leaks through the perforated bottom 7 of each of the compartments 5 and 6 of the mould —1—. This cement asbestos mixture that passes through the mould —1— runs down an inclined chute 25 and thence through a pipe 26 to a tank where it can be reintroduced again into the supply tank 22. Moreover, the standard 27 upon which the table 17 rests has formed thereabout a trough 28 adapted to drain also through pipe 26.

Above the table 17 is supported by posts 30—30 a double T shaped rail 31 which carries in the center part thereof a block 32. A vertically movable head or dome 35 is suspended from block 32 by a shaft 36. The shaft 36 is equipped with screw threads adapted to engage a corresponding internal thread formed in a recess in the block 32. The upper portion of the shaft 36 has a key way 37, whereby to receive a key fixed to the bevel gear 38 in order to turn with said gear 38. Gear 38 is in mesh with a second bevel gear 40 fixed to revolve with the shaft 42 mounted in journals 43—43 carried by the block 44 attached to the upper surface of the rail 31. The shaft 42 is revolved, whereby to revolve bevel gears 40, 38 and, thereby, raise and lower the dome 35 by a hand wheel 45 to which is attached radial extending members 46 adapted to aid in turning said wheel 45. The wheel 45 may be turned by automatic means.

The dome 35 has formed therein a chamber at 50 which is connected by a pipe 51 with a compressed air tank, not here shown, whereby air under pressure can be supplied to press the water out of the plastic mass through the perforated bases 7—7 of the compartments 5 and 6 of the mould —1—, through corresponding perforations made at 52 in the table top 17 to the chamber therebelow formed in the hollow part of said table 17, thereby forming shingles 14 in said compartments 5 and 6 of the mould —1—. The air pressure is released by a valve 53 that is operated manually or automatically and is admitted to said chamber 50 by a valve, not here shown, that is located adjacent the air compression tank, also not shown.

A deflector plate 55 is attached to the interior of the dome 35 and within the chamber 50 by bolts or members 56. The deflector plate 55 is located opposite the opening 57 that admits the compressed air, whereby to distribute the same evenly over all sections of the shingles 14 in the compartments 5 and 6.

The operation of the machine is effected by placing the mould —1— beneath the conduits 18—18, then opening the valve 20 by means of hand lever 21, which can be actuated automatically, whereby to fill the compartments 5 and 6 of the mould —1— with the cement asbestos mixture. The mould —1— is pushed or pulled then under the dome 35 by means of hand rods 3—3, whereupon, the dome 35 is lowered by turning the hand wheel 45 in order to bring the rubber edges 60 of the dome 35 into contact with the corresponding rubber edges of the mould —1— to make an hermetically sealed chamber therebetween.

Compressed air is admitted then by turning a valve, not shown, to the chamber 50 within said dome 35, whereby to drive the water out of the plastic mass in said mould and through the perforated base 7 thereof, the perforated portion 52 of the table 17 and into the chamber formed directly below in said table 17. Thereafter, the compressed air is released by turning the valve 53, the dome 35 is elevated and the frame —1— drawn out from thereunder, whereupon the foregoing operations are repeated.

The shingles 14 are removed from the mould —1—, by placing a sheet of metal over said mould and then turning it upside down. The shingles 14 as thus removed, are piled in stacks for drying and setting.

The mould can be used with any other suitable machine of similar character, as the one heretofore described.

Furthermore, similar machines can be built to manufacture slates, slabs, brick and other kindred products.

Having thus described my invention what I claim as new and desire to secure by Letters Patent is:

1. In a machine for making shingles, a mould having beveled edges covered with rubber, and means cooperating with said mould, whereby to form shingles with beveled edges.

2. In a machine for making shingles, a mould having beveled edges, a dome independent of said mould and adapted to co-operate therewith, whereby to form an hermetically sealed chamber, and means for admitting compressed air into said chamber, whereby to force water out of the shingles.

3. In a machine for making shingles, a mould having beveled edges covered with rubber, pins upstanding in said mould adapted to form holes in the shingles, and a dome for co-operating with said mould, whereby to form shingles.

4. In a machine for making shingles, a mould having beveled edges covered with rubber, means having rubber edges adapted to co-operate with said mould, whereby to from an hermetically sealed chamber, and means for admitting compressed air to said chamber, whereby to force water out of said shingles.

5. In a machine for making shingles, a mould having beveled edges covered with rubber, a dome for cooperating with said mould, whereby to form an hermetically sealed chamber, and valves for admitting compressed air to said chamber, whereby to force water out of the shingles therein.

6. In a machine for making shingles, a mould, a dome independent thereof and adapted to co-operate with said mould, whereby to form an hermetically sealed chamber, valves for admitting compressed air to said chamber, whereby to force water out of the shingles while in said chamber, and a deflector plate located opposite the opening for admitting compressed air, whereby to distribute the compressed air evenly throughout said chamber.

7. In a machine for making shingles, a mould having beveled edges covered with rubber, a perforated metal base in said mould, a dome adapted to cooperate with said mould, whereby to form an hermetically sealed chamber, valves for admitting compressed air to said chamber, whereby to force water out of the shingles in said chamber and a deflector plate located in said dome for distributing air evenly throughout the chamber in the dome.

8. In a machine for making shingles, a mould having beveled edges covered with rubber, a laminated perforated metal base in said mould, a movable dome adapted to cooperate with said mould, means for forming an hermetically sealed chamber between said mould and dome, valves for admitting compressed air to said chamber, whereby to force water out of the shingles in said chamber, and screw means for elevating and lowering said dome.

9. In a machine for making shingles, a mould having beveled edges covered with rubber, a laminated perforated metal base in said mould, a movable dome adapted to cooperate with said mould, rubber edges for forming an hermeticaly sealed chamber between said mould and dome, valves for admitting compressed air to said chamber, and a deflector plate for dispersing said compressed air, as it enters said chamber.

10. In a machine for making shingles, a mould having beveled edges covered with rubber, a laminated perforated metal base in said mould, a movable dome adapted to cooperate with said mould, means for forming an hermetically sealed chamber between said mould and dome, valves for admitting compressed air to said chamber, a deflector plate for dispersing said compressed air as it enters said chamber, and pins upstanding in said mould, whereby to make holes in the shingles.

11. In a machine for making shingles, a mould having beveled edges, means for filling said mould with an asbestos mixture, a movable dome adapted to co-operate with said mould, rubber means for forming an hermetically sealed chamber between said mould and dome, valves for admitting compressed air to said chamber, a deflector plate mounted within the dome for dispersing said compressed air, and means mounted in said mould, whereby to form holes in said shingles.

In testimony whereof I have affixed my signature.

ROBERT W. JAGENBURG.